July 21, 1942.   F. E. HURXTHAL ET AL   2,290,752
ROLLING EXTRUDER
Filed Aug. 15, 1939   2 Sheets-Sheet 1
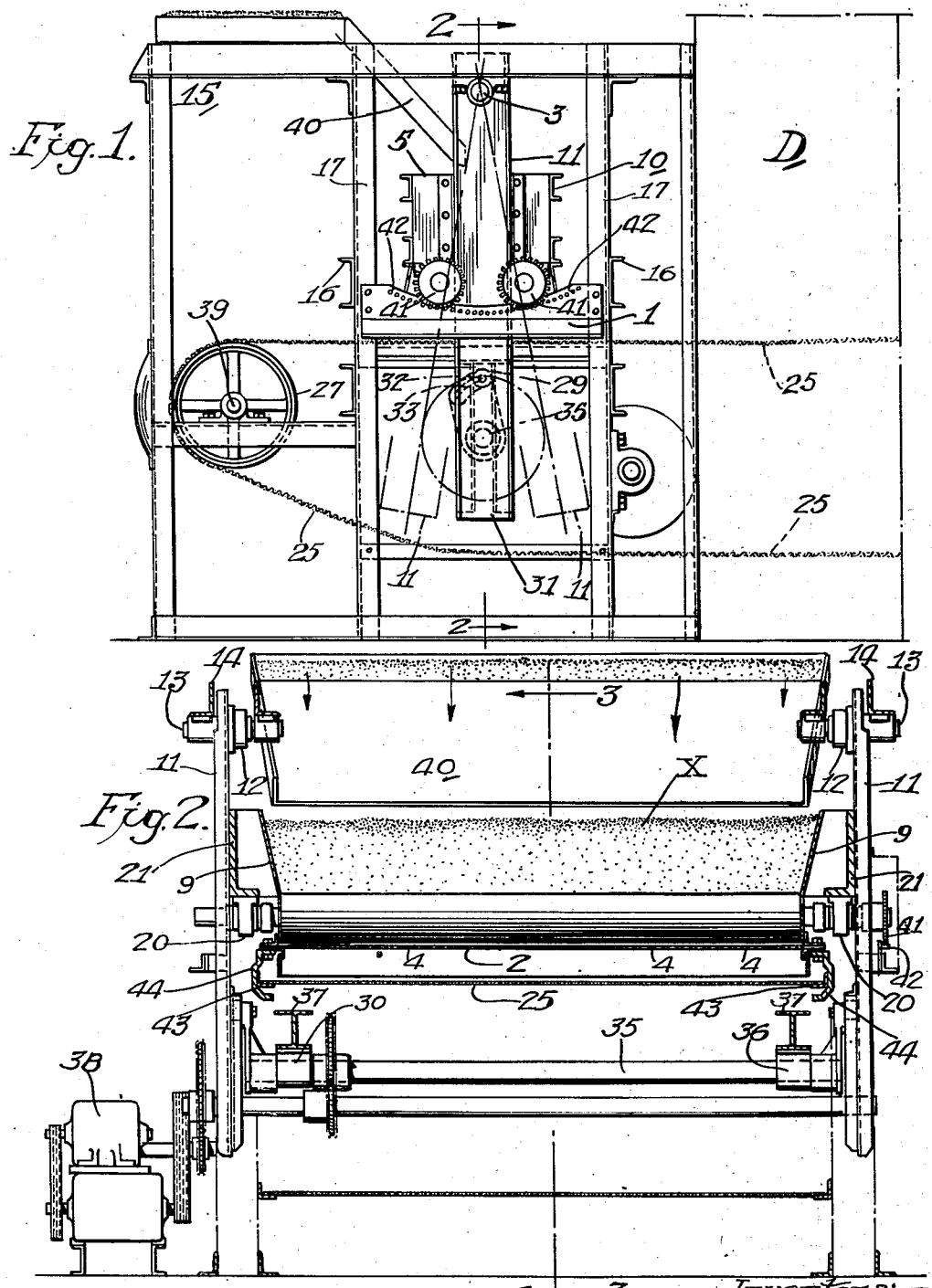
Inventors:—
Frederick E. Hurxthal
John J. Franklin
by their Attorneys
Howson & Howson Inventors:
Frederick E. Hurxthal
John J. Franklin
by their Attorneys Patented July 21, 1942

2,290,752

UNITED STATES PATENT OFFICE 2,290,752

ROLLING EXTRUDER

Frederick E. Hurxthal, Glenside, and John J. Franklin, Philadelphia, Pa., assignors to Proctor & Schwartz, Incorporated, Philadelphia, Pa., a corporation of Pennsylvania Application August 15, 1939, Serial No. 290,322

12 Claims. (Cl. 18—12)

This invention relates to a device for reducing bulk of plastic material into relatively small units of substantially uniform cross section suitable for drying purposes.

The invention particularly relates to a device of the extruder type, wherein the material is forced through openings or dies of predetermined contour to produce the uniform cross sectional shape of the units; and especially to that type of extruder wherein the shaping dies are formed in a plate above which an extruding roll or rolls operates in contact with the plate and forces the material through the die openings.

Heretofore, in the above-noted type of apparatus, the extruding roll moved through a bulk of material lying on the die plate and effected more or less agitation of the bulk during the extruding process. Some forms of chemicals, when in plastic form, after being removed from the filter, are in a rather solid condition, and excessive agitation thereof, while in this form, will cause the material to revert to a soft, soupy consistency detrimental to the material and subsequent working thereof.

The object of this invention is to provide a rolling extruder in which undue agitation of the material is eliminated, and wherein the material is fed directly to and in advance of the extruding rolls as the rolls travel along and in contact with the extruding surface.

The construction and operation of a device embodying the principles of the present invention will be fully disclosed hereinafter, reference being had to the accompanying drawings, of which:

Figure 1 is a side elevation;

Fig. 2 is a transverse sectional elevation taken on the line 2—2, Fig. 1;

Figure 3:
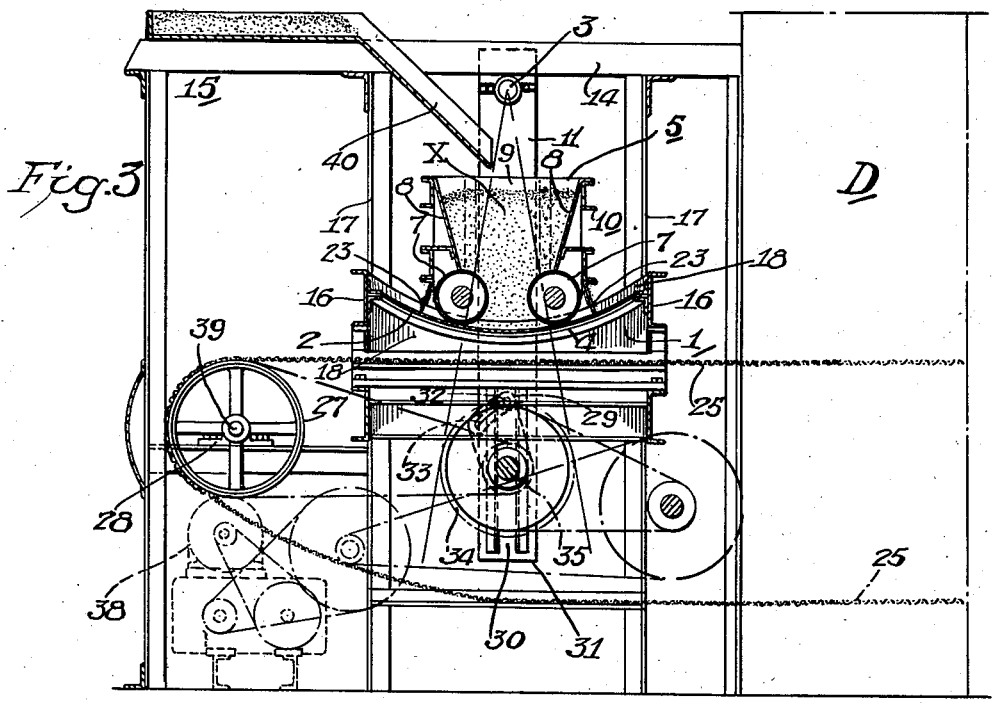
Fig. 3 is a longitudinal sectional elevation taken on the line 3—3, Fig. 2.
Figure 4:
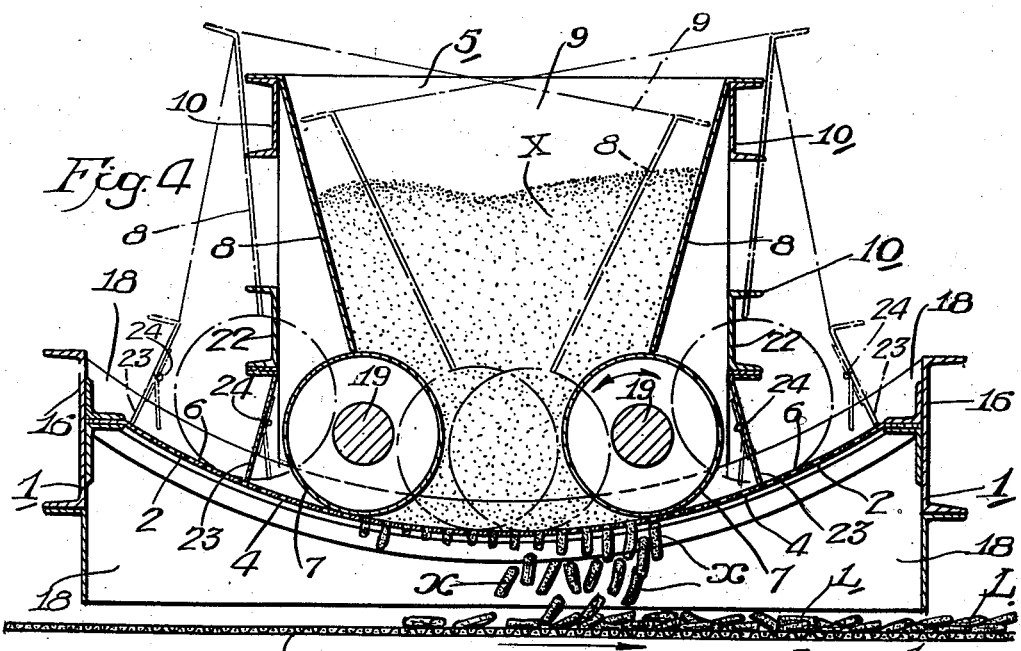
Fig. 4 is an enlarged sectional elevation corresponding to a portion of Fig. 3.

As shown particularly in Figs. 3 and 4, the device primarily comprises a stationary base structure 1 for supporting an arcuate foraminous die plate 2, the curvature of which is formed on an arc of a circle, about a center 3 disposed at a substantial distance above the plate 2. The die plate 2 is provided with a multiplicity of die openings 4, through which plastic units $x$ of substantially uniform cross section are forced from a bulk X of said material in a hopper structure 5 which is movable back and forth, in a single path, above and parallel to the upper surface 6 of the die plate 2.

Extruding rolls 7, 7 are carried by and form part of the hopper 5. The rolls 7, 7 operate in rolling contact with the foraminous surface 6 of the die plate 2 during the oscillatory motion of the hopper.

The hopper 5 also includes side walls 8, 8 which terminate adjacent the extruding rolls 7, 7 respectively, and end walls 9, 9 lying adjacent the opposite ends respectively of said extruding rolls. The side walls 8, 8 between the end walls 9, 9 direct the bulk of material X solely between the rolls 7, 7, whereby, as the hopper 5 and the rolls 7, 7 move back and forth relative to the die plate 2, a supply of the material X will at all times be present in front of one of the extruding rolls 7, as these rolls retain contact with and advance along the surface 6 of the die plate 2.

In the present instance, the hopper 5, and the extruding rolls 7, 7, are supported by a rocking frame 10. This frame also includes arms 11, 11 which extend above and below the end walls 9, 9 of the hopper 5. The upper ends of the arms 11, 11 are provided with bearings 12, 12 for receiving pivots 13, 13 carried by structural elements 14, 14, which form part of a general framework 15, and which have their axis coincident with the center 3 of the arc on which the extruding surface 6 is formed.

The base structure 1 comprises transversely extending members 16, 16 which are rigidly secured to upright members 17, 17 forming part of the framework 15, and between which apron members 18, 18 extend above and below the die plate 2, in close adjacent relation to the end plates 9, 9 of the hopper 5.

The extruding rollers 7, 7 are respectively secured to shafts 19, 19 which project outwardly beyond the end walls 9, 9 of the hopper 5 and are rotatably mounted in bearings 20, 20 carried by brackets 21, 21 which are secured to the upright members 11, 11 of the rocking frame 10.

In order to avoid sliding movement of the extruding rolls 7, 7 over the surface 6 of the die plate 2, each of the shafts 19 at one or both ends is provided with a toothed wheel 41 which meshes with a similarly toothed element 42 fixed to and carried by the framework 15, whereby as the frame 10 rocks back and forth, the rolls 7, 7 are positively driven by extraneous power in addition to the power derived from their frictional contact with the surface 6 of the die plate 2.

Secured to and depending from transverse members 22, 22 of the rocking frame 10 are scraper plates 23, 23, which, as the frame 10 swings in one direction, engage the surface 6 of the die plate 2 and remove therefrom any material which may have adhered to the plate, between the margins of the die openings therein. The scraper plates 23, 23 are divided into upper and lower sections which are pivotally connected together at 24, 24, whereby, as the frame swings in the opposite direction, the lower edges of the scraper plates will be released from the surface 6 of the die plate 2.

The units x, x, upon extrusion, fall onto a horizontally movable conveyer 25. As the hopper 5 oscillates, the conveyer 25 moves constantly in one direction, at a substantially uniform rate of speed, causing said units to build up in a layer L of substantially uniform thickness, in more or less haphazard relation with respect to each other, for delivery beyond the extruding device.

In the present instance, the extruding device is arranged at one end of a suitable drier D, and the conveyer 25 carries the layer L of units x directly into and through the drier, in which air of predetermined temperature and humidity is in constant circulation, for effecting drying of said units.

The conveyer 25 is of the endless belt type, and at each end of the drier is trained around suitable supporting drums, one of which is 27. The drum 27 is fixed to a shaft 39 which is rotatably mounted in suitable bearings 28 carried by the framework 15.

Rocking of the frame 10 is accomplished by a crank 29 operating in a groove 30 formed on the inside of each of the lower portions 31 of the uprights 11, 11 forming part of the swinging frame 10. In the present instance, the crank 29 is in the form of a roller which is rotatably mounted on a crank stud 32. The crank stud 32 is adjustably mounted in an arcuate slot 33 formed in the outer end of a lever 34. The levers 34, 34 are secured to a cross shaft 35, which is rotatably mounted in bearings 36, 36 carried by longitudinally extending beams 37, 37 forming part of the framework 15.

The shaft 35 is driven through suitable speed-reducing means from a motor or other source of power 38, which, if desired, may also be operatively connected to the shaft 39 upon which the drum 27 for the conveyor 25 is mounted, and whereby the conveyer 25 will move at a predetermined lineal speed and to a predetermined extent for each oscillation of the hopper 5, to produce the uniform layer L of units x on the conveyer. However, the conveyer 25 may be driven from any other suitable source of power in definite speed relation to the oscillations of the hopper 5.

The bulk of material X within the hopper 5 may be replenished as required through a suitable chute 40, carried by the framework 15 and extending between the upright members 11, 11 of the frame 10, to a point above the center of extreme limits of the oscillating movement of the hopper 5. The chute 40 may be fed manually or by a suitable conveyer which may receive the material directly from the filter in which the material is reduced to a plastic state from the form of a suspension in liquid.

Directly under the base 1, the conveyer 25 is supported along its opposite side edges by rails 43, 43, which in turn are carried by beams 44, 44 secured to the framework 15.

We claim:

1. The combination of a base having a foraminous surface and a hopper for plastics relatively movable one with respect to the other parallel to said surface, laterally spaced rollers carried by the hopper in rolling contact with said surface, and means forming part of said hopper for directing and confining said plastics solely between said rollers.

2. The combination of a base having a foraminous surface and a hopper for plastics relatively movable one with respect to the other parallel to said surface, laterally spaced rollers carried by the hopper in rolling contact with said surface, means forming part of said hopper for directing and confining said plastics solely between said rollers, and means in addition to said rolling contact for rotating said rollers during said relative movement between said base and said hopper.

3. The combination of a base having a foraminous surface and a hopper for plastics relatively movable one with respect to the other parallel to said surface, laterally spaced rollers carried by the hopper in rolling contact with said surface, means forming part of said hopper for directing and confining said plastics solely between said rollers, and means for moving said hopper back and forth over a single path on said surface.

4. The combination of a base having a foraminous surface and a hopper for plastics relatively movable one with respect to the other parallel to said surface, laterally spaced rollers carried by the hopper in rolling contact with said surface, means forming part of said hopper for directing and confining said plastics solely between said rollers, means for relatively moving said hopper and base back and forth in a single path, and a conveyer movable below said surface and substantially in the same general direction with said path for receiving plastics extruded through the openings thereof.

5. The combination of a base having a foraminous surface and a hopper for plastics relatively movable one with respect to the other parallel to said surface, laterally spaced rollers carried by the hopper in rolling contact with said surface, means forming part of said hopper for directing and confining said plastics solely between said rollers, and cleaning means carried by and movable with said hopper in contact with said surface.

6. The combination of a base having a foraminous surface and a hopper for plastics relatively movable one with respect to the other parallel to said surface, laterally spaced rollers carried by the hopper in rolling contact with said surface, means forming part of said hopper for directing and confining said plastics solely between said rollers, and cleaning means carried by and movable with said hopper in contact with said surface as the hopper moves in one direction and out of contact with said surface as the hopper moves in the opposite direction.

7. The combination of a base having a foraminous surface and a hopper for plastics relatively movable one with respect to the other parallel to said surface, laterally spaced rollers carried by the hopper in rolling contact with said surface, means forming part of said hopper for directing and confining said plastics solely between said rollers, said surface being formed on an arc of a circle from a center above said surface, and a frame supporting said hopper pivoted on an axis coincident with said center.

8. The combination of a base having a foraminous surface and a hopper for plastics relatively movable one with respect to the other parallel to said surface, laterally spaced rollers carried by the hopper in rolling contact with said surface, means forming part of said hopper for directing and confining said plastics solely between said rollers, said surface being formed on an arc of a circle from a center above said surface, a frame supporting said hopper pivoted on an axis coincident with said center, a toothed rack concentric to said surface, and toothed wheels carried by said frame and operatively connected to said rollers and meshing with said toothed rack.

9. The combination of a base having a foraminous surface and a hopper for plastics relatively movable one with respect to the other parallel to said surface, laterally spaced rollers carried by the hopper in rolling contact with said surface, means forming part of said hopper for directing and confining said plastics solely between said rollers, said surface being formed on an arc of a circle from a center above said surface, a frame supporting said hopper pivoted on an axis coincident with said center, a toothed rack concentric to said surface, toothed wheels carried by said frame and operatively connected to said rollers and meshing with said toothed rack, and means for oscillating said frame relative to said surface and said toothed rack.

10. The combination of a base having a foraminous surface and a hopper for plastics relatively movable one with respect to the other parallel to said surface, laterally spaced rollers carried by the hopper in rolling contact with said surface, means forming part of said hopper for directing and confining said plastics solely between said rollers, said surface being formed on an arc of a circle from a center above said surface, a frame supporting said hopper pivoted on an axis coincident with said center, and pivoted scraper plates carried by said frame at opposite sides respectively of said hopper outside said rollers for alternately contacting and cleaning said surface as the hopper moves in one direction and losing contact with said surface as the hopper moves in the opposite direction.

11. The combination of a base having a foraminous surface, a hopper for plastics movable back and forth along said surface, a pair of rollers rotatably mounted in said hopper transversely to said surface and having rolling contact with said surface, and a pair of upwardly extending walls in said hopper arranged with their lower edges in close parallel relation to the upper portions of the peripheral surfaces of said rollers respectively, said walls directing and confining said plastics solely between said rollers.

12. The combination of a base having a foraminous surface, a hopper for plastics movable back and forth along said surface, a pair of rollers rotatably mounted in said hopper transversely to said surface and having rolling contact with said surface, a pair of upwardly extending walls in said hopper arranged with their lower edges in close parallel relation to the upper portions of the peripheral surfaces of said rollers respectively, said walls directing and confining said plastics solely between said rollers, and means for positively rotating said rollers at a peripheral speed equal to the speed of movement of the hopper relative to said surface to eliminate sliding motion between the peripheral surfaces of said rollers and said foraminous surface and maintain positive rolling action therebetween.

FREDERICK E. HURXTHAL.
JOHN J. FRANKLIN.